No. 800,474. PATENTED SEPT. 26, 1905.
A. NEUDECKER.
HORSE WHIPPING MECHANISM.
APPLICATION FILED OCT. 5, 1904.
2 SHEETS—SHEET 1.
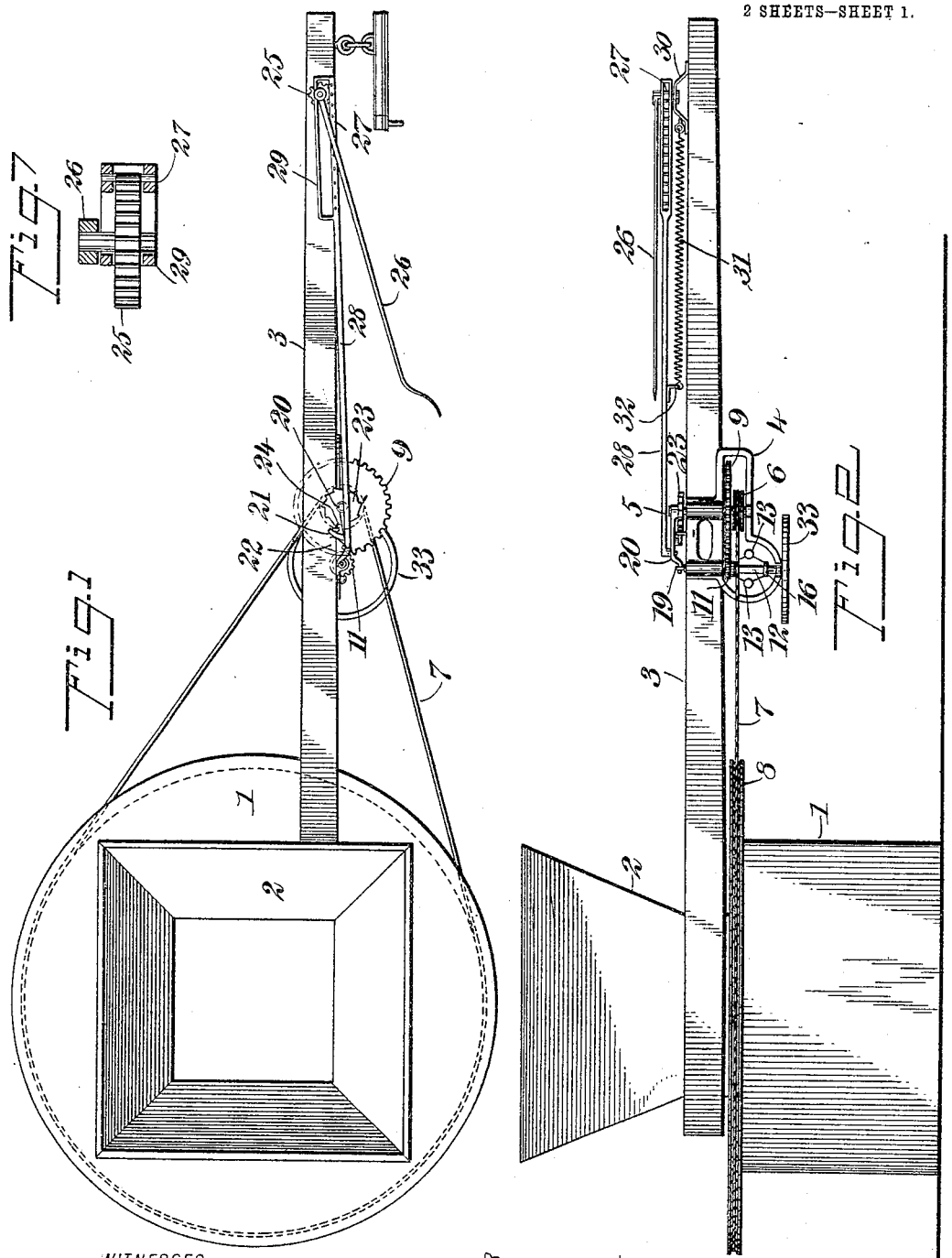
WITNESSES:
J. H. Bookly
C. R. Ferguson
INVENTOR
Andrew Neudecker
BY
Munn
ATTORNEYS

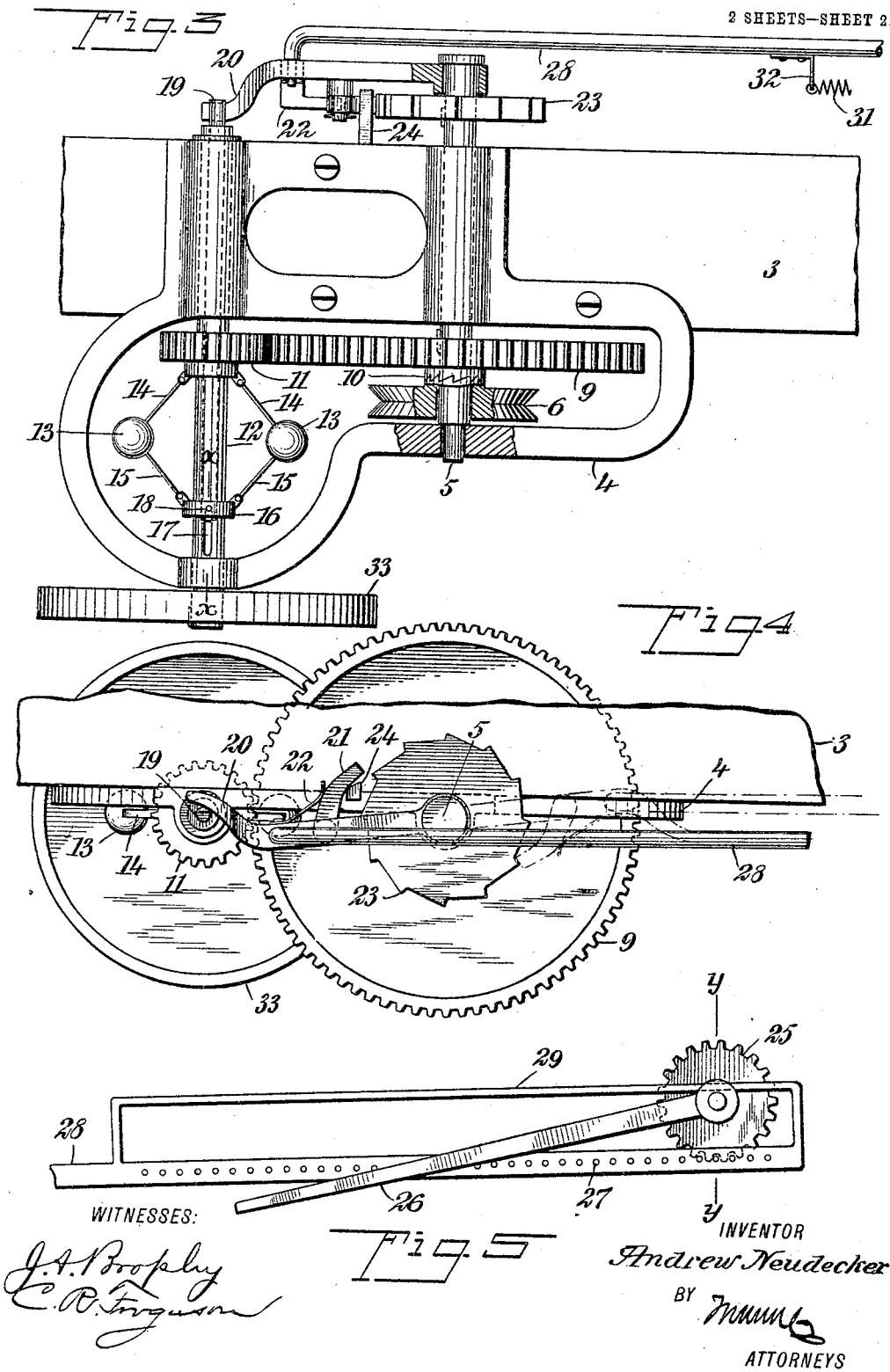

UNITED STATES PATENT OFFICE.

ANDREW NEUDECKER, OF CLEMENTS, MINNESOTA.

HORSE-WHIPPING MECHANISM.

No. 800,474. Specification of Letters Patent. Patented Sept. 26, 1905.

Application filed October 5, 1904. Serial No. 227,322.

*To all whom it may concern:*

Be it known that I, ANDREW NEUDECKER, a citizen of the United States, and a resident of Clements, in the county of Redwood and State of Minnesota, have invented a new and Improved Horse-Whipping Mechanism, of which the following is a full, clear, and exact description.

This invention relates particularly to improvements in mechanism for applying a whip at intervals to a horse hitched to the sweep of a feed-grinding mill or the like, the object being to provide a simple means in connection with the mill whereby should the animal slack up or travel at a gait below a desired speed a whip would be automatically released to strike and continue to strike the horse until the proper speed is gained, when the operation of the whip is automatically stopped, obviating the attention of a driver, and thus resulting in an economical operation of a horse-power mill.

I will describe a horse-whipping mechanism embodying my invention and then point out the novel features in the appended claims.

Reference is to be had to the accompanying drawings, forming a part of this specification, in which similar characters of reference indicate corresponding parts in all the figures.

Figure 1 is a plan of a grinding-mill, showing the whipping mechanism embodying my invention as applied thereto. Fig. 2 is a side elevation thereof. Fig. 3 is a side elevation, on an enlarged scale, of the actuating mechanism. Fig. 4 is a plan view thereof. Fig. 5 is a detail plan view showing the whip attachment and rack. Fig. 6 is a section on the line $x\,x$ of Fig. 3, and Fig. 7 is a section on the line $y\,y$ of Fig. 5.

Referring to the drawings, 1 designates a mill-casing of ordinary construction, in which the grinding devices operate, the mill being fed from a hopper 2. Extended outward from the grinding mechanism is a sweep 3. Mounted on the sweep is a frame 4, in which an actuating-shaft 5 has its bearings, and on this actuating-shaft is a pulley 6, engaged by a band 7, which passes around a disk 8, fixed on the casing 1. Therefore it is obvious as the sweep moves around the band will cause a rotary movement of the pulley 6.

Mounted on the shaft 5 above the pulley 6 is a gear-wheel 9, and preferably there will be a clutch connection 10 between the pulley and gear-wheel, so that should the sweep be moved in a backward direction the whip mechanism will not be operated. The gear-wheel 9 meshes with a pinion 11 on a tubular shaft 12, having bearings in the frame 4, and attached to this pinion is a governor comprising centrifugal balls 13, attached to upper arms 14, which are pivoted to the hub of the pinion 11, and lower arms 15, extended from the balls, have pivotal connection with a collar 16, movable lengthwise of the tubular shaft, and extended through opposite vertical channels 17 in the tubular shaft and connecting with the collar 16 is a pin 18, which is attached to the lower end of a holding and releasing shaft 19, movable vertically in the tubular shaft and designed at times to extend above the tubular shaft.

Mounted loosely on the upper end of the shaft 5 is a detent-arm 20, designed to engage with the upper end of the rod or shaft 19, as will be hereinafter described. Mounted to swing on the detent-arm 20 is a pawl 21, yieldingly pressed by a spring-plate 22, attached to the arm and designed to engage with a ratchet-wheel 23, secured to the shaft 5, and the pawl at a certain time will be moved out of engagement with the ratchet-wheel by striking against a fixed vertically-extended pin 24.

Mounted on the sweep 3 near the outer end is a pinion 25, to which is fixedly attached a whip 26. This pinion is engaged by a rack 27, from which a pitman 28 extends inward and has pivotal connection with the trip-arm 20. The rack is prevented from disengagement with the pinion 25 by means of a loop 29 on the portion of the pitman which engages with the hub of the pinion at the opposite side engaged by the rack.

As clearly shown in Fig. 2, the stud on which the pinion 25 rotates is secured in a bracket 30, attached to the sweep, and from this bracket a spring 31 extends to a connection with a lug 32 on the pitman, and therefore this spring serves to draw the pitman in an outward direction.

In the operation when the horse is traveling around at a normal speed the governor will hold the rod or shaft 19 upward in its locking engagement with the trip-arm 20. Should the speed diminish, the balls 13 will move inward, forcing the rod 19 downward out of engagement with the arm 20, and as the arm is thus released the pawl 21 will engage with the ratchet-wheel 23, which, it is understood, is at all times in rotary motion. At this time the arm 20 will serve practically as a crank for reciprocating the pitman 28. As the pitman reciprocates the rack carried thereby obviously will cause a rotary movement of the pitman 25 to oscillate the whip 26 back and forth. As the speed of the animal increases the rod 19 will be raised by the outward movement of the governor-balls, so that the upper end of said rod will come into the line of movement of the arm 20, and at the same time the pawl 21 will be moved by the pin 24 out of engagement with the ratchet-wheel, thus permitting said ratchet-wheel, with the other gearing and governor, to rotate freely. Should the horse suddenly stop, a fly-wheel 33 on the lower end of the governor-shaft by its momentum will operate to continue the movement sufficiently long to release the mechanism. When the arm 20 comes to a stop, the whip will remain stationary in its normal position away from the horse, as indicated in Fig. 1.

Having thus described my invention, I claim as new and desire to secure by Letters Patent—

1. The combination with a sweep, of a driving-shaft thereon, a pulley on the driving-shaft, a fixed disk, a band connection between said fixed disk and the pulley, a gear-wheel attached to the driving-shaft, a ratchet-wheel secured to said shaft, an arm loosely mounted on said shaft, a governor operated from the gear-wheel on the shaft, a part operated by said governor for engaging with said arm, a spring-pressed pawl carried by the arm for engaging with the ratchet-wheel, means for moving said pawl out of engagement with the ratchet-wheel, a pinion arranged on the sweep, a whipping device attached to said pinion, a pitman having swinging connection with said arm, and a rack on the pitman engaging with said pinion.

2. The combination with a sweep, of a driving-shaft, a pulley on said driving-shaft, a fixed disk, a band extended from said disk to said pulley, a ratchet-wheel on the upper end of the shaft, an arm mounted to swing on the shaft, a pawl carried by said arm for engaging with the ratchet-wheel, a pin adapted to be engaged by said pawl for moving it out of engagement with the ratchet-wheel, a governor controlled from said driving-shaft for moving a part into or out of engagement with said arm, and a swinging whip mounted on the sweep and operated from said arm.

3. The combination with a sweep, of a driving-shaft mounted thereon, means for rotating the same, a gear-wheel on said shaft, a ratchet-wheel on the upper end of said shaft, an arm loosely mounted on the upper end of said shaft, a tubular shaft, a pinion on said tubular shaft engaging with said gear-wheel, the said tubular shaft being slotted, a collar movable on the tubular shaft, a governor having connection with the fixed portion of the shaft and with said collar, a rod movable in the tubular shaft and having a pin connection with said collar, the said pin passing through the slots, a spring-pressed pawl carried by the arm for engaging with the ratchet-wheel, means for releasing the pawl from the ratchet-wheel at a certain time, a pinion mounted on the sweep, a whip connected to the pinion, a pitman having tubular connection with said arm, a rack on the pitman for engaging with said pinion on the sweep, and a spring connection between said pitman and a fixed part on the sweep.

4. The combination with a sweep, of a driving-shaft mounted thereon, means for rotating the same, a gear-wheel on said shaft, a ratchet-wheel on the upper end of said shaft, an arm loosely mounted on the upper end of said shaft, a tubular shaft, a pinion on said tubular shaft engaging with said gear-wheel, the said tubular shaft being slotted, a balance-wheel on the tubular shaft, a collar movable on the tubular shaft, a governor having connection with the fixed portion of the shaft and with said collar, a rod movable in the tubular shaft and having a pin connection with said collar, the said pin passing through the slots, a spring-pressed pawl carried by the arm for engaging with the ratchet-wheel, means for releasing the pawl from the ratchet-wheel at a certain time, a pinion mounted on the sweep, a whip connected to the pinion, a pitman for engaging with said pinion on the sweep, and a spring connection between said pitman and a fixed part on the sweep.

In testimony whereof I have signed my name to this specification in the presence of two subscribing witnesses.

ANDREW NEUDECKER.

Witnesses:
MICHAEL A. NEUDECKER,
ANTON S. NEUDECKER.